Jan. 3, 1956     I. WARSHAWSKY     2,729,473
ELECTRICAL FIXTURE SWIVEL JOINT CONSTRUCTIONS
Filed June 28, 1951
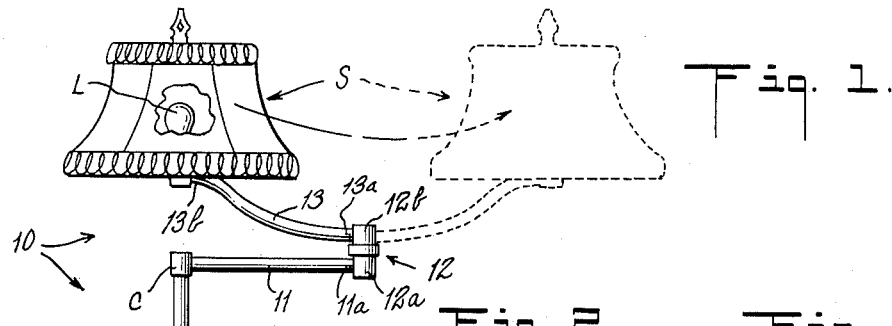
Fig. 1.
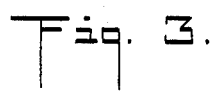
Fig. 3.
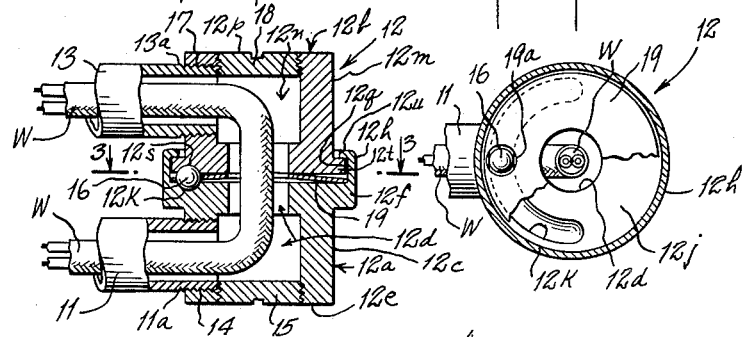
Fig. 2.
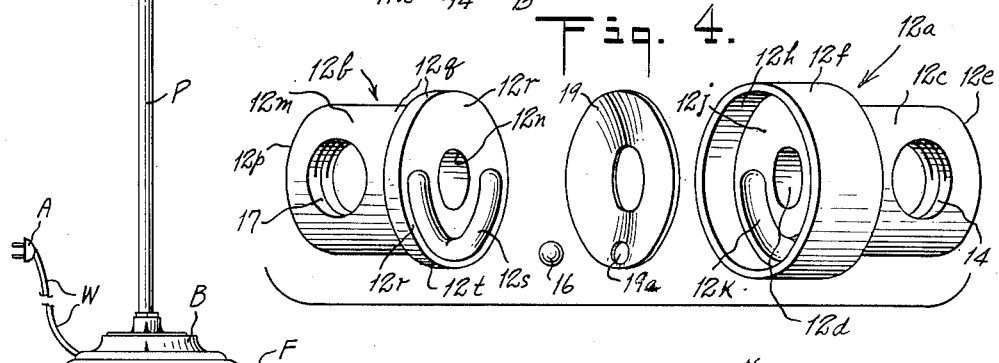
Fig. 4.
Fig. 6.
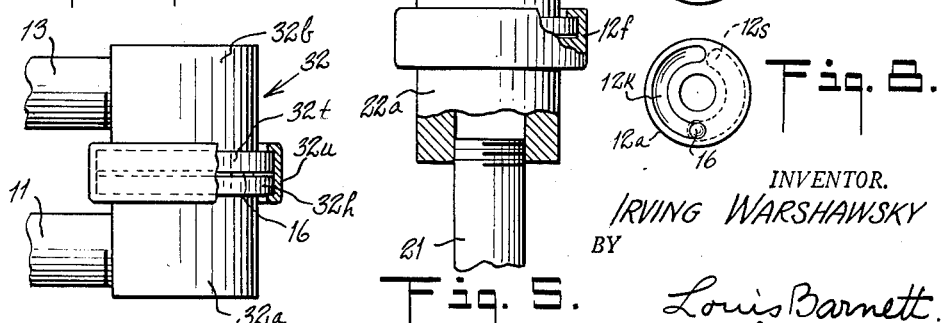
Fig. 5.
Fig. 7.
Fig. 8.
INVENTOR.
IRVING WARSHAWSKY
BY
Louis Barnett
ATTORNEY › # United States Patent Office

2,729,473
Patented Jan. 3, 1956

2,729,473
ELECTRICAL FIXTURE SWIVEL JOINT CONSTRUCTIONS
Irving Warshawsky, Brooklyn, N. Y.
Application June 28, 1951, Serial No. 234,013
2 Claims. (Cl. 285—96.6)

This invention relates to electrical wiring installations and fittings and more particularly is directed to improved conduit swivel joint constructions through which electric wiring extend.

Among the objects of the invention is to provide improved conduit swivel joint constructions of the character described which shall comprise few and simple parts, which shall be readily assembled in electrical installations and fittings such as a lighting fixture having a supporting base and lamp portion to provide relative rotary movement therebetween, which shall comprise readily movable parts retained in assembly to prevent accidental displacement from desired set positions, which shall be relatively cheap to manufacture yet rugged to withstand rough usage, and which shall be efficient and practical to a high degree in use.

Other objects of the invention will in part be obvious and in part hereinafter pointed out.

The invention accordingly consists of features of construction, combination of elements and arrangement of parts which will be exemplified in the constructions hereinafter disclosed, the scope of the application of which will be indicated in the claims following.

In the accompanying drawing in which are various possible illustrative embodiments of the invention, Fig. 1 is an elevational view of an electric bridge type floor lamp having an electrical conduit fitting swivel joint constructed to embody the invention shown interposed between a relatively fixed upright conduit pipe and a movably swingable pipe lamp bracket supporting arm thereof, the latter with the shade being shown in dotted lines in a swung position.

Fig. 2 is an enlarged fragmentary view showing the improved electrical conduit fitting swivel joint portion of the floor lamp shown in Fig. 1, part of said joint portion being broken away to expose the interior structures and interconnecting assembly.

Fig. 3 is a cross-sectional view taken on line 3—3 in Fig. 2 showing the spring frictional drag cage washer broken away.

Fig. 4 is a perspective exploded view of the parts of the improved swivel joint portion shown in Figs. 2 and 3 before assembly.

Fig. 5 is a front elevational view of another improved form of construction of the improved swivel joint portion embodying the invention having an upright conduit pipe and a movably swingable pipe lamp bracket arm disposed to extend in right angle relation coupled together.

Fig. 6 is a front elevational view of another construction of the improved swivel joint portion embodying the invention, interconnecting parts thereof being broken away to show a modified assembly, and Figs. 7 and 8 are diagrammatic views showing the parts of the swivel joint in opposite extreme positions. In Fig. 7 the parts are shown in one extreme position with the ball acting as a stop and swingable in the direction shown by the arrows toward the other extreme position shown in Fig. 8.

Referring in detail to the drawing the invention may be utilized, for example, in the construction of a portable bridge type floor lamp 10 having a base B for resting on floor F to support a suitable light source such as an electric bulb L having a shade S positioned at a desired level above the floor F as is clear from Fig. 1. Said bridge floor lamp 10 may be provided with suitable wiring W which extends beyond the base B to terminate in a conventional attachment plug A, said floor lamp 10 having a pipe portion P upstanding from the base B through which wiring W extends. Said pipe portion P may terminate at a desired height above the floor F in an elbow pipe coupling C from which horizontally extends a pipe arm 11 in a relatively overhanging position as shown in Fig. 1.

At free end 11a of pipe arm 11 there may be provided a conduit swivel joint fitting portion 12 constructed to embody the invention for conecting pipe arm free end 11a to end 13a of a swing pipe arm 13, the other end 13b of said arm 13 may carry the electric bulb L and shade S in various adjustable swinging positions with relation to swivel joint fitting portion 12 as a turning axis. Said base B, upstanding pipe P, elbow coupling C, pipe arm 11, swivel joint fitting portion 12, and swing pipe arm 13 may be made to serve as a continuous conduit through which wiring W extends from plug A to the bulb L carried at pipe arm end 13b in the well understood manner.

Referring now to Figs. 2, 3 and 4 conduit swivel joint fitting portion 12 is seen to comprise tandem, that is end to end, positioned interconnected mating halves 12a and 12b, which may be made if desired of metallic stock, machined or molded to form a tubular structure of circular cross-section with a continuous bore or hollow space extending axially therethrough.

Fitting portion half 12a, as seen from Figs. 2 and 4, may rigidly connect through side wall 12c thereof with said pipe end 11a in any suitable manner as by screw joint 14 so as to communicate directly with a bore axial space 12d provided in fitting portion half 12a. Outer end 12e of the latter may be provided with a suitable closure disc 15 screwed or otherwise firmly embedded in said outer end 12e as is clear from Fig. 2. Inner end 12f of said mating half 12a, opposite said outer end 12e, may be formed to have a cupping flange in the form of a peripheral rim annular extension 12h projecting beyond a flat bearing surface 12j thereof, the latter lying concentrically in a plane extending at right angle relation to the axial bore 12d.

Depressed into bearing surface 12j, which as here shown is slightly greater in area than the cross sectional area of a midportion of mating half 12a, there may be provided a semi-circular shaped groove or raceway 12k concentrically positioned to extend between axial space 12d and annular extension rim 12h, said raceway 12k being constructed and arranged to have a bearing ball 16 ride therealong as shown in Figs. 2, 3 and 4.

Mating half 12b may be made similar to mating half 12a above described in providing therefor side wall 12m, axial space 12n, outer end 12p, inner end 12q, and screw joint 17, corresponding to said side wall 12c, axial space 12d, outer end 12e, inner end 12f, and screw joint 14 respectively. Axial spaces 12d and 12n as shown in Fig. 2 are disposed to form a continuous passageway for wiring W therethrough, the latter extending from pipe arm 11 through conduit swivel joint fitting portion 12 to swing pipe arm 13, mating half 12b being rigidly connected with the latter through side wall 12m in any suitable manner as by screw joint 17 to provide direct communication to said axial space 12n. Outer end 12p of mating half 12b may also be provided with a closure disc 18 similar to closure disc 15 in said outer end 12e of mating half 12a.

Mating half 12b may have a peripheral rim shoulder 12t on inner end 12q, the latter also being provided with a bearing surface 12r, and a semi-circular shaped groove or raceway 12s, like bearing surface 12j with raceway 12k at the inner end 12f of mating half 12a, respectively, above described and as shown in Figs. 2 and 4.

In the assembly of swivel joint fitting portion 12, peripheral rim shoulder 12t of said inner end 12q may be neatly fitted into annular flange extension 12h of mating half 12a with said surfaces 12j and 12r in face to face relation and permitting free relative rotary movement between said mating halves 12a and 12b. Raceways 12k and 12s will then be aligned for relative movement with mating halves 12a and 12b, respectively, in complementary circular paths in which bearing ball 16 smoothly rides as is clear from Figs. 2 and 3.

To retain said halves 12a and 12b with the bearing ball 16 in raceways 12k and 12s effectively in the assembly of swivel joint fitting portion 12, annular extension rim flange 12h of mating half 12a may be inturned as at 12u to engage about shoulder 12t of mating half 12b, as shown in Fig. 2.

If desired a frictional spring drag cage washer 19 concavo-convex in shape as shown in Fig. 4 may be fitted under compression between bearing surfaces 12j and 12r, and a suitable opening 19a provided in spring cage washer 19 to permit rotation of bearing ball 16 in raceways 12k and 12s as is clear from Figs. 2 and 3.

The practical operation of the invention will now be apparent. Conduit swivel joint fitting portion 12 may be constructed and assembled in an electric lighting installation, such as in portable bridge type floor lamp 10 described above and shown in Figs. 1 to 4. When the shaded light source is swung from the full line position to that shown in dotted lines in Fig. 1, or vice versa, mating half member 12b of said joint fitting portion 12 which carries pipe arm 13 swivels with respect to mating half member 12a, the latter being held relatively stationary by pipe arm 11. Said mating members 12a and 12b are interconnected and retained against separation from the assembly position shown by the engagement of shoulder 12t provided at the inner end 12q of mating member 12b nested in annular extension flange 12h and inturned flange rim 12u integrally formed with inner end 12f of mating member 12a as is clear from Fig. 1. Axial space 12d and 12n provide sufficient passageway for flexing of the portions of the wiring W extending through said swivel joint fitting portion 12 without damaging said wiring W during said light source swinging.

Closure discs 15 and 18 may be removed to facilitate installation of wiring W.

Swivel joint fitting portion 12 may be assembled and used with or without said spring cage washer 19. When assembled as shown in Fig. 2 said cage washer 19 serves as a friction drag against face to face bearing surfaces 12j and 12r.

Complementary grooves 12k and 12s provided in bearing surfaces 12j and 12r, respectively, forming the raceway for ball 16 serve with bearing ball 16 as means for limiting the swinging movement or stop of permissible rotation for mating member 12b with respect to member 12a, bearing ball 16 acting to prevent rotation beyond the point where said ball 16 is confined between opposite ends of said grooves 12k and 12s as is clear from Figs. 7 and 8. Thus if said grooves 12k and 12s are made at least semicircular in length the shaded light source carried by swingable pipe arm 13 can be rotated substantially 360 degrees with respect to fixed pipe 11. By making said grooves 12k and 12s longer or shorter the range of possible swinging movement may be varied over a wide range.

In Fig. 5 there is shown conduit swivel joint fitting portion 22 which may be made similar to swivel joint fitting portion 12 above described in every respect except that mating half member 22a has pipe arm 21 connected thereto in a vertical relation rather than horizontally as shown in Figs. 1 and 2. Such difference in assembly can be readily accomplished by using the thread opening in which closure disc 15 is seated for connecting in pipe arm 21 in swivel joint fitting portion 12.

In Fig. 6 a modified embodiment of the invention is shown in which a swivel joint fitting portion 32 is shown having mating half members 32a and 32b of identical construction to include projecting inner end shoulders 32h and 32t. Said mating members 32a and 32b may be retained against separation by clamping ring 32u of U-shaped cross section which extends about said shoulders 32h and 32t allowing only sufficient play to permit swivelling movement between said members 32a and 32b and rolling of bearing ball 16 in its raceway and spring cage washer 19 in the same manner as described above for the assembly of swivel joint fitting portion 12.

It will thus be seen that there is provided improved conduit swivel joint constructions of the character described whereby the several objects of this invention are achieved and which are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. An electric conduit swivel joint fitting construction comprising interconnected tubular mating members having circular shaped end surfaces assembled in close axial alignment relation forming a joint permitting relative swiveling movement between said members, the tubularity of said members providing a continuous passageway extending through said end surfaces for installing wiring therethrough, said end surfaces each having therein a circular complementary groove closed at its ends extending in an arcuate path concentrically and forming a raceway, a bearing ball riding in said raceway coacting with said closed ends for limiting said relative swiveling movement, and a spring frictional drag cage washer of concavo-convex shape interposed under compression between said end surfaces, said washer having an opening therein of a diameter substantially equal to that of said bearing ball through which the latter extends.

2. In an electric conduit swivel joint fitting construction, interconnected mating members formed with circular shaped and swiveling surfaces assembled in face to face axial alignment relation, each surface having an axial opening wherethrough wiring passes and having an arcuately shaped groove therein in concentrically spaced relation from said opening, said grooves being positioned in complementary position to form a raceway, a bearing ball riding in said raceway for limiting relative swiveling movement between said mating members, a spring frictional drag cage washer of concavo-convex shape interposed between said end swiveling surfaces, said washer having an opening therein of a diameter substantially equal to that of said bearing ball through which the latter extends, said mating members each being structurally identical, and a ring band engaging adjoining ends of said members for interconnection thereof and for maintaining said spring washer under compression, said grooves being semicircular in extent to provide relative turning movement of said members limited by said ball to less than 360 degrees.

References Cited in the file of this patent

UNITED STATES PATENTS

| Number | Name | Date |
|---|---|---|
| 585,516 | Eveland | June 29, 1897 |
| 1,286,384 | Mezger | Dec. 3, 1918 |
| 1,324,895 | Hertz et al. | Dec. 16, 1919 |
| 1,756,094 | McGuirk | Apr. 29, 1930 |
| 1,853,153 | Skeel | Apr. 12, 1932 |
| 2,048,313 | Adolfson | July 21, 1936 |
| 2,242,303 | Irmischer | May 20, 1941 |
| 2,409,262 | Eldred | Oct. 15, 1946 |
| 2,569,531 | Kunzog | Oct. 2, 1951 |